(12) United States Patent
Manning et al.

(10) Patent No.: US 10,659,312 B2
(45) Date of Patent: *May 19, 2020

(54) NETWORK ANOMALY DETECTION

(71) Applicant: International Business Machines Corporation, Armonk, NY (US)

(72) Inventors: Ian Manning, Cork (IE); Eric Thiebaut-George, Cork (IE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/274,781

(22) Filed: Feb. 13, 2019

(65) Prior Publication Data

US 2019/0182118 A1     Jun. 13, 2019

Related U.S. Application Data

(63) Continuation of application No. 14/476,959, filed on Sep. 4, 2014, now Pat. No. 10,225,155.

(30) Foreign Application Priority Data

Sep. 11, 2013   (GB) .................................. 1316143.5

(51) Int. Cl.
*H04L 12/24*     (2006.01)
*H04L 12/26*     (2006.01)
*G06F 11/30*     (2006.01)

(52) U.S. Cl.
CPC .............. *H04L 41/14* (2013.01); *H04L 43/06* (2013.01); *H04L 43/08* (2013.01); *H04L 41/16* (2013.01); *H04L 41/5012* (2013.01)

(58) Field of Classification Search
CPC ......... H04L 41/14; H04L 43/06; H04L 43/08; H04L 41/16; H04L 41/5012
See application file for complete search history.

(56) References Cited

U.S. PATENT DOCUMENTS

| 7,444,263 B2 | 10/2008 | White et al. |
| 7,818,418 B2 | 10/2010 | Bansal et al. |
| 7,836,356 B2 | 11/2010 | Haas et al. |
| 7,870,243 B1 | 1/2011 | Aikens et al. |
| 8,850,263 B1 | 9/2014 | Yourtee et al. |
| 9,015,536 B1 | 4/2015 | Ricken et al. |

(Continued)

FOREIGN PATENT DOCUMENTS

WO    WO 2013/043170 A1    3/2013

OTHER PUBLICATIONS

List of IBM Patents or Patent Applications Treated as Related, Feb. 12, 2019, 2 pages.
Search Report under Section 17(5) dated Mar. 6, 2014, Application No. GB1316143.5, 3 pages.
"Auto-Discovery of Patterns in Metrics and Discovery of Displaced Patterns in Metrics", IP.com, IPCOM000221170D, Sep. 4, 2012, 6 pages.

(Continued)

*Primary Examiner* — John A Follansbee
*Assistant Examiner* — Lam T Do
(74) *Attorney, Agent, or Firm* — Stephen J. Walder, Jr.; Nicholas D. Bowman

(57) ABSTRACT

Mechanisms for anomaly detection in a network management system are provided. The mechanisms collect metric data from a plurality of network devices and determine metric types for the metric data using metric type reference data. The mechanisms determine and apply properties from the metric type reference data to metrics of the determined metric types. The mechanisms monitor subsequent metric data for anomalies that do not conform to the applied properties.

20 Claims, 5 Drawing Sheets

(56) References Cited

U.S. PATENT DOCUMENTS

| | | |
|---|---|---|
| 2005/0228878 A1 | 10/2005 | Anstey et al. |
| 2006/0176824 A1 | 8/2006 | Laver et al. |
| 2006/0282301 A1 | 12/2006 | Olson |
| 2006/0293777 A1 | 12/2006 | Breitgand et al. |
| 2007/0083513 A1 | 4/2007 | Cohen et al. |
| 2007/0156652 A1 | 7/2007 | Horstmanshof et al. |
| 2007/0179823 A1 | 8/2007 | Bhaskaran et al. |
| 2009/0030753 A1 | 1/2009 | Senturk-Doganaksoy et al. |
| 2010/0082379 A1 | 4/2010 | Chan et al. |
| 2011/0055817 A1 | 3/2011 | Noble et al. |
| 2011/0098973 A1 | 4/2011 | Seidman |
| 2011/0133945 A1 | 6/2011 | Klein et al. |
| 2011/0238376 A1 | 9/2011 | Dang et al. |
| 2011/0276836 A1 | 11/2011 | Kahana et al. |
| 2011/0289025 A1 | 11/2011 | Yan et al. |
| 2012/0198455 A1 | 8/2012 | Lee et al. |
| 2012/0243410 A1 | 9/2012 | Vedula et al. |
| 2012/0259962 A1 | 10/2012 | Bose et al. |
| 2013/0030761 A1 | 1/2013 | Lakshminarayan et al. |
| 2013/0091266 A1 | 4/2013 | Bhave et al. |
| 2013/0110761 A1 | 5/2013 | Viswanathan et al. |
| 2013/0132001 A1 | 5/2013 | Yacout et al. |
| 2013/0290047 A1 | 10/2013 | Bash et al. |
| 2014/0351412 A1 | 11/2014 | Elisha |
| 2015/0074267 A1 | 3/2015 | Manning et al. |

OTHER PUBLICATIONS

Cullen, Nathan, "SmartCloud Analytics—Predictive Insights", IBM Corporation, developerWorks, updated Apr. 3, 2014, accessed on Jul. 25, 2014, 2 pages.

Meier, J.D. et al., "Chapter 15—Key Mathematic Principles for Performance Testers", https://msdn.microsoft.com/en-us/library/bb924370.aspx; Sep. 2007, pp. 1-10.

Murray, Joseph F. et al., "Machine Learning Methods for Predicting Failures in Hard Drives: A Multiple-Instance Application", Journal of Machine Learning Research 6 (2005) 783-816, http://www.jmlr.org/papers/volume6/murray05a/murray05a.pdf, May 2005, pp. 783-816.

Thottan, Marina et al., "Anomaly Detection Approaches for Communication Networks", Algorithms for Next Generation Networks, Computer Communications and Networks, http://users.ece.gatech.edu/~jic/anomaly-book-chap-09.pdf, Feb. 6, 2010, pp. 1-19.

Wang, Chengwei et al., "Online Detection of Utility Cloud Anomalies Using Metric Distributions", 2010 IEEE/IFIP Network Operations and Management Symposium—NOMS 2010: Mini-Conference, 2010, pp. 96-103.

Yang, Jun, "Review of Multi-Instance Learning and Its applications", Carnegie Mellon University, http://www.cs.cmu.edu/~juny/MILL/review.htm, School of Computer Science, Technical Report, (month unknown) 2005, 7 pages.

Zhou, Zhi-Hua, "Multi-Instance Learning: A Survey", Technical Report, AI Lab, Department of Computer Science & Technology, Nanjing University, Nanjing, China, http://cs.nju.edu.cn/zhouzh/zhouzh.files/publication/techrep04.pdf, Mar. 2004, pp. 1-31.

Cross Metric Engine 200

Cross Metric Method 300

Metric Type and Metric Property Data 400

| Metric Type | Metric Properties (SP=Standard Property; IP=Identifier Property; BP=Bad Property; GP=Good Property) |
|---|---|

FIGURE 2

| Metric Type and Property Reference Data 400 | | |
|---|---|---|
| Reference Metric Type | Reference Metric Properties (SP=Standard Property; IP=Identifier Property; BP=Bad Property; GP=Good Property) | Examples |
| Percent 402 | IP:0-100; GP=mode; BP:jumping from mode to >90 | memory usage; processor usage |
| Availability 404 | IP: high value <100; GP=steady value; BP=20% drop | Resource (device or service) availability |
| Response time 406 | IP=less than one; SP=mode; GP=less than mode | |
| Counter 408 | IP:ever increasing number; SP=increase frequency; SP=delta; BP:Static for 10xincrease frequency | Total packet count since reboot |
| General Enumeration 410 | IP:constant value; BP infrequent variation from constant value | |

FIGURE 4

NETWORK ANOMALY DETECTION

BACKGROUND

This invention relates to a method and apparatus for anomaly detection in a network management system.

Known network management tool monitor computer systems are manually configured for usage patterns, thresholds, and other characteristics. Configurations are manually customized by administrators who observe data for every computer system in the network and determine key performance indicators (KPI). Typically such configurations are bundled with a computer network management tool as part of a product. The problem with bundling configuration data as a product is that it is often not what the customer actually needs because needs and networked computer systems tend to be widely unique. Off the shelf configuration data assumes specific KPIs and requires administrator skill and time to tune and establish actual baselines for every KPI on every computer system. Such tuning is prone to human error. In addition, when a new KPI is added, or an old KPI is changed, a vendor is often required to update a package before it can be used by the network management tool.

Network management tools include performance management tools such as IBM Tivoli Monitoring (ITM), IBM Tivoli Composite Application Manager and IBM Tivoli Netcool Performance Management (TNPM), fault management tools such as IBM Netcool OMNIbus, and service monitoring tools such as IBM Tivoli Business Service Manager (TB SM). These tools are configured on installation to look at certain KPIs and notify operators when their values cross a predefined threshold. The result is that a threshold is frequently tuned when the usage pattern of the resource being monitored changes. IBM, Netcool, OMNIbus and Tivoli are registered or unregistered trademarks of International Business Machines Corporation in the US and/or other countries.

Typically a company defines performance thresholds and raises an alarm when a defined threshold is breached (for example for central processor unit usage and response times). One problem with this approach is that threshold definitions take a long time to establish in order to reduce the number of false alerts and missed alerts. Configuring threshold definitions is a time consuming and expensive process because it requires a deep understanding of an underlying platform.

A solution to reduce configuration requirements is to provide a set of configuration settings for each metric. These configuration settings are usually grouped in metadata "packs" and a different pack is needed for each operating system. Each pack can take weeks to build because of the number of data sources to connect to.

SUMMARY

In a first aspect of the invention there is provided a network managing system comprising: a collecting engine for collecting metric data from a plurality of managed network devices; an evaluation engine for determining, for each metric, a corresponding metric type based on metric type reference data; a modeling engine for applying properties from the metric type reference data to metrics of the determined metric types; and a listening engine for monitoring subsequent metric data for anomalies that do not conform to the applied properties. The network managing system may further comprise a group evaluation engine for determining metric groups from the collected metrics.

In a second aspect of the invention there is provided a method of managing network devices comprising: collecting metric data from a plurality of network devices; determining metric types for the metric data using metric type reference data; determining and applying properties from the metric type reference data to metrics of the determined metric types; and monitoring subsequent metric data for anomalies that do not conform to the applied properties. The method may further comprise determining metric groups from the collected metrics. Determining metric types may be performed after determining metric groups because metrics can be better typed when part of known metric group comprising more data.

The method may further comprise configuring, if a majority of the metrics in a group are determined as a particular type, all metrics in the group to that particular type. Moreover, the method may further comprise configuring, if some metrics in a group are determined not a particular type, all the metrics in that group not to that particular type even if a majority of the metrics are of the type. This is particularly true of counters and pegging. The method may further comprise providing an indication of any anomaly to a user interface. Furthermore, collecting metrics may be performed by streaming real time data.

Metric collection may be performed as a bulk process. Metric collection may be performed for a fixed period. Moreover, metric collection may be performed over a rolling time period. Furthermore, metric groupings may be determined by locating metrics having the same properties.

The illustrative embodiments provide proactive network monitoring with a largely reduced configuration. The embodiments reduce the need for metadata packs and a customer does not have to provide any topology information or threshold definition. Such embodiments build a model of the monitored network computer systems using predictive analytics. The illustrative embodiments provide an autonomous proactive anomaly detection system with reduced configuration and bundled metadata. Little is assumed about the metrics to be monitored.

Certain metric changes are determined by the illustrative embodiments as special metric changes and something that a customer should be notified about. For example, if a metrics goes from 90 to 100% then a notification is generated by default. If the metric is for availability, then this is deemed a good metric change and a default notification will not be generated. If the metric is for memory utilization, then the metric change is deemed bad and a default notification is generated. The illustrative embodiments provide a way of learning about individual metric features and determining if such a metric change is a good or bad metric change by performing cross-metric analysis and information consolidation.

The impact of the illustrative embodiments is reduced development work and system configuration as the system can learn metric features by collecting data and not by having an expert user configure these features for each metric. In addition, the illustrative embodiments provide for a reduced number of false positive alarms (no alarm generated when a metric is "too good") and a higher number of positive alarms. The illustrative embodiments further result in reduced service cost, reduced capital expenditure, reduced operating expense, and reduced total cost of ownership.

In some illustrative embodiments, the embodiments work by performing cross-metric analysis and consolidating the result of heuristics gathered by analyzing each metric individually. Therefore, this method combines univariate analysis of each metric, and multivariate consolidation across all metrics. Typically, a network management system inspects many different metric types on many different resources.

Generally, the illustrative embodiments provide cross analysis of metrics and consolidation of individual metric heuristics in order to determine a global metric-type-wide feature. The illustrative embodiments reduce the number of alarms generated and will not raise an alarm when the value is too good compared to what was expected. The illustrative embodiments provide data gathering and statistics building of individual metrics, consolidation of the results, creation of additional statistics from the consolidation, and application of some common characteristics to other metrics of the same type to aid in reducing false positives in self-learning anomaly detection systems.

Therefore, in general, this disclosure presents mechanisms that learn about the data features for an individual KPI in a data-agnostic system, and then applythose features across the set so that the user does not need to specify them. For example, a user would not have to specify if a KPI is a peg.

Monitoring in this context is less about monitoring a system and more about applying analytics to the data collected. The illustrative embodiments are not tied to continuous monitoring and they can receive metric data associated with a resource in one or more batches. Illustrative embodiments are envisaged for network management tools with built-in monitoring as well as complex network management analysis systems.

Anomaly notification can have a controlling effect on the process carried on in the network device and outside the network management tool. The illustrative embodiments operate at a machine and/or system level of a computer and below an overlying application level that may be running on network devices. The illustrative embodiments result in the computer are made to operate autonomously and in a new way. The illustrative embodiments have a real effect leading to an increase in the speed or reliability of the computer.

In a third aspect of the invention there is provided a computer program product for managing network devices, the computer program product comprising a computer-readable storage medium having computer-readable program code embodied therewith and the computer-readable program code configured to perform operations of the methods. The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing operations of the methods.

In a fifth aspect of the invention there is provided a data carrier aspect of the illustrative embodiments that comprises functional computer data structures to, when loaded into a computer system and operated upon thereby, enable said computer system to perform operations of the methods. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is a component diagram of one illustrative embodiment;

FIG. 4 shows example data types of one illustrative embodiment; and

DETAILED DESCRIPTION OF THE EMBODIMENTS

Figure 1:
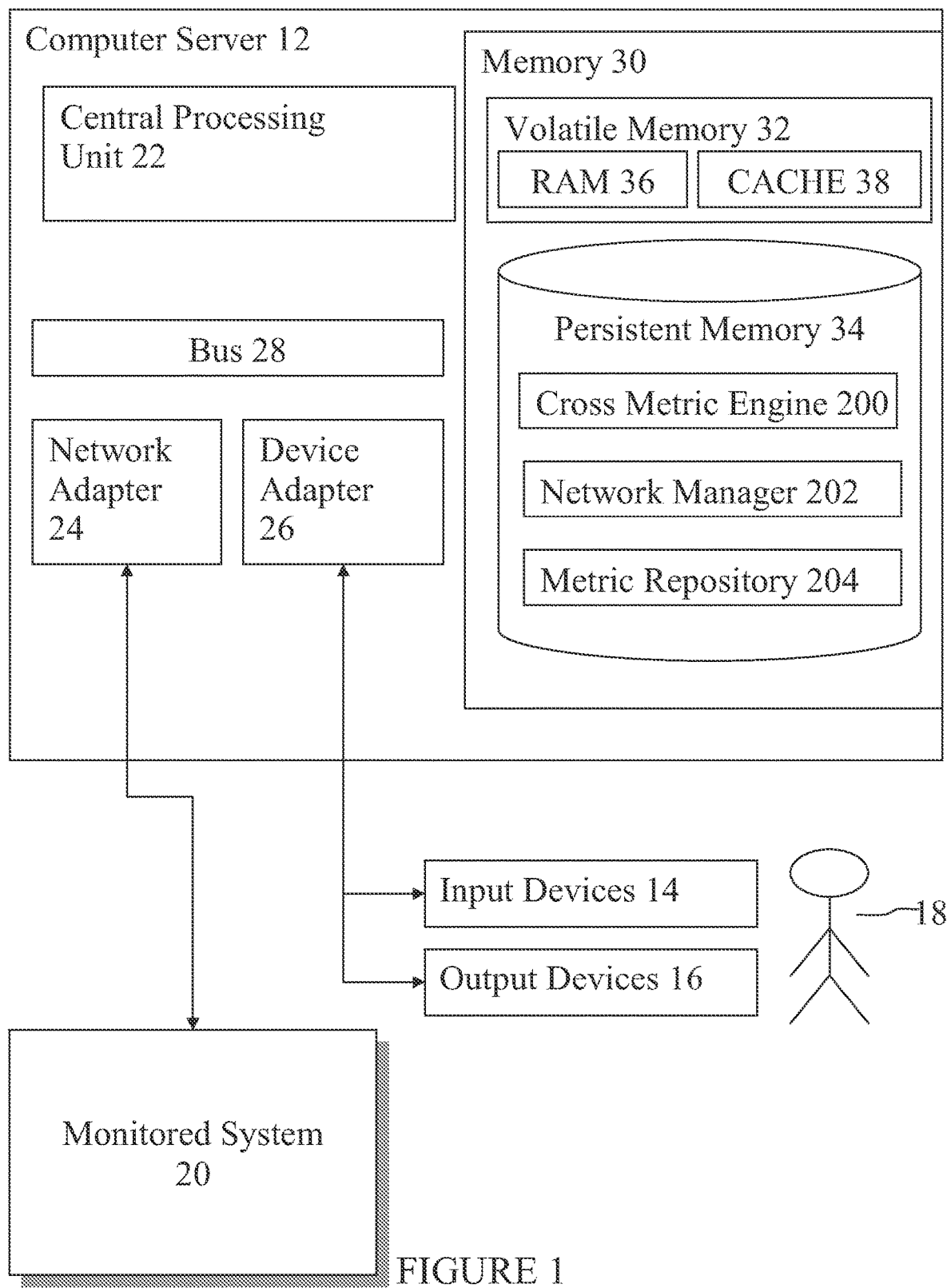
FIG. 1 is a deployment diagram of one illustrative embodiment.

Referring to FIG. 1, the deployment of one illustrative embodiment in network management system 10 is described. Network management system 10 is operational with numerous other general purpose or special purpose computing system environments or configurations. Examples of well-known computing processing systems, environments, and/or configurations that may be suitable for use with network management system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Network management system 10 may be described in the general context of computer system-executable instructions, such as program modules, being executed by a computer processor. Generally, program modules may include routines, programs, objects, components, logic, and data structures that perform particular tasks or implement particular abstract data types. Network management system 10 may be embodied in distributed cloud computing environments where tasks are performed by remote processing devices that are linked through a communications network. In a distributed cloud computing environment, program modules may be located in both local and remote computer system storage media including memory storage devices.

Network management system 10 comprises: general-purpose computer server 12 and one or more input devices 14 and output devices 16 directly attached to the computer server 12. Network management system 10 is connected to a monitored system 20. Network management system 10 communicates with a user 18 using input devices 14 and output devices 16. Input devices 14 include one or more of: a keyboard, a scanner, a mouse, trackball or another pointing device. Output devices 16 include one or more of a display or a printer. Network management system 10 communicates with network devices of monitored system 20. The monitored system of devices 20 can use a local area network (LAN), a wide area network (WAN), or the Internet.

Computer server 12 comprises: central processing unit (CPU) 22; network adapter 24; device adapter 26; bus 28 and memory 30. CPU 22 loads machine instructions from memory 30 and performs machine operations in response to the instructions. Such machine operations include: incrementing or decrementing a value in register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and monitored system 20 for enabling communication between the computer server 12 and network devices. Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Network management system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: cross metric engine 200; network manager 202; and metric repository 204. Further program modules that support the preferred embodiment but are not shown include firmware, boot strap program, operating system, and support applications. Each of the operating system, support applications, other program modules, and program data or some combination thereof, may include an implementation of a networking environment.

Cross metric engine 200 provides the operation of the illustrative embodiments when executed by CPU 22. Cross metric engine 200 operates in the context of a network manager 202 for independent acquisition and management of metric data that is stored in metric repository 204 by the network manager 202.

Network management system 10 communicates with monitored system 20 using a local area network (LAN), a general wide area network (WAN), and/or a public network like the Internet via network adapter 24. Network adapter 24 communicates with the other components of computer server 12 via bus 28. It should be understood that although not shown, other hardware and/or software components could be used in conjunction with network management system 10. Examples, include, but are not limited to: microcode, device drivers, redundant processing units, external disk drive arrays, redundant array of independent disks (RAID), tape drives, and data archival storage systems.

Referring to FIG. 2, cross metric engine 200 comprises: cross metric method 300 and metric type and metric property data 400. Metric type and metric property data 400 comprises metric type definitions and metric property definitions and is the template for storing the results of cross metric method 300. A number of predefined metric types have predefined metric properties that are labeled with predefined property types. Predefined metric property types comprises: a standard metric property (SP); a metric property identifier (IP); a bad metric property (BP); and a good metric property (GP).

A metric property identifier (IP) is a property that is characteristic of and identifies a metric. For example, a metric that always has a value in the range 0-100 is a percent metric. A good metric property (GP) is a behavior of a metric that is stable and expected. For example, a percent metric may remain stable for 80% of the time. A bad metric property (BP) is a behavior of a metric that is unusual and that triggers the anomaly notification. For example, a percent metric that remains stable for 80% of the time (good metric property) and then changes by over 50% would be a bad property.

A standard metric property (SP) is a metric property that is neither bad nor good nor directly used to identify a metric. However, it may be used to define a bad property, a good property, or identifier property. For example, a frequency of change is a standard metric property that may be used in calculating of a bad property, a good property or an identifier property.

Figure 3:
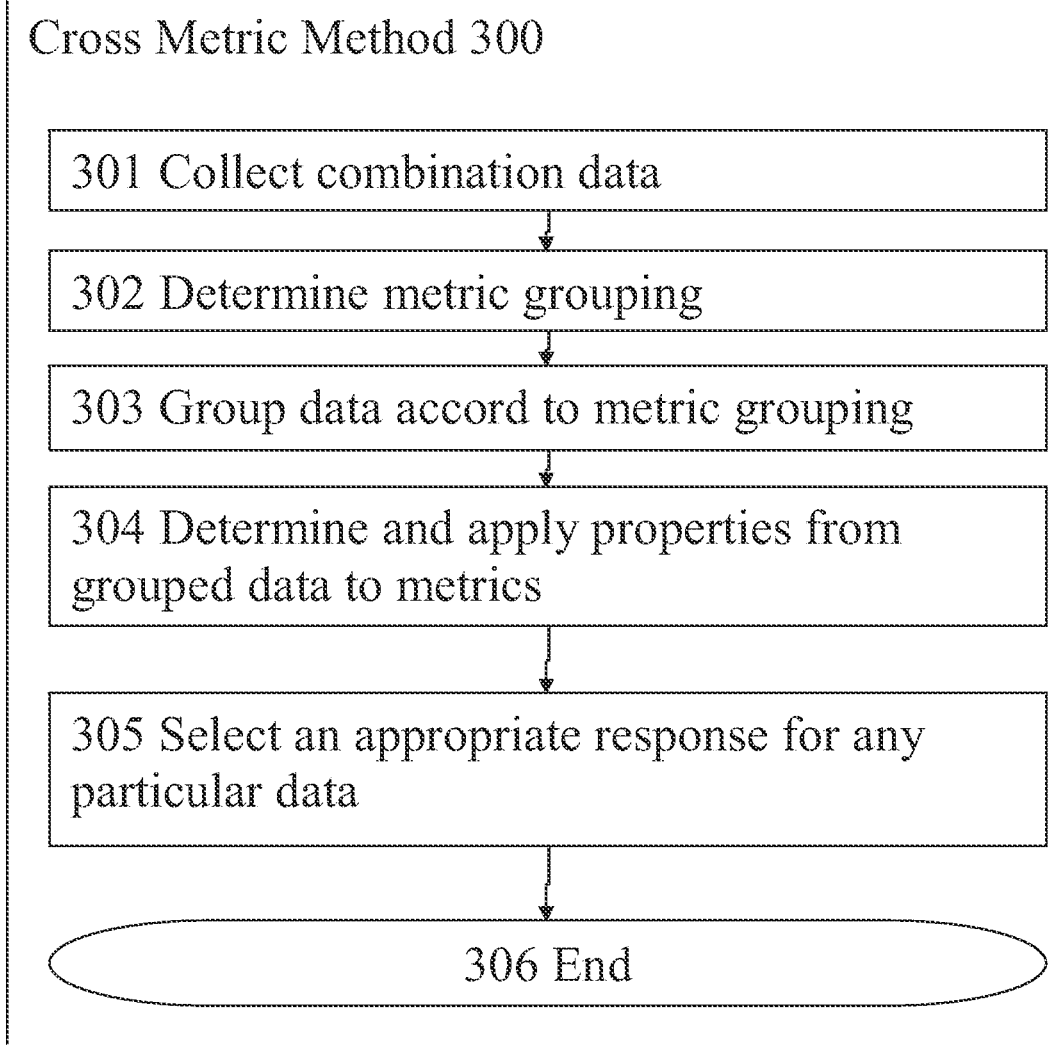
FIG. 3 is a flow diagram of a process of one illustrative embodiment.

Referring to FIG. 3, cross metric method 300 comprises logical process steps 301 to 306. Step 301 is for collecting statistics from available resources and metric combinations (simply called metrics from now on). For this, known methods such as computing minimum, maximum, mode, standard deviation, or heuristics such as "is this metric likely to be a peg?" are used to calculate properties. For heuristics, per-metric results can have more than two values, for example, "yes, no, maybe", or even a confidence factor (for example. "80% confident that this metric is a peg"). Step 301 can be performed in several different ways: in a streaming manner; or as a bulk process for example on a large in-memory or in-DB dataset. The learning process can either be done on a training period (for example, two weeks of a thousand timestamps), on a rolling window (for example, the last hundred timestamps) or continuously evolving.

Step 302 is for determining metric groupings from the collected metrics. Metric groupings can be determined in several ways but usually by specifying a group as being all metrics of the same resource or same properties. Alternate solutions exist, for example, if two metrics are extracted from the same database column, in some cases it can be assumed that they represent the same metric unless each row also has a "metric type" type of column, in which case this can also be used for grouping. Such automatic detection and consolidation means that information can be collected from many metrics at the same time, and consolidated in order to help determine metric type. This means that administrators do not have to configure all this information manually and that metric type can be automatically deduced.

Step 303 is for determining metric type from metric type reference data. Such typing of the metrics is advantageously performed after groups are determined from the metrics themselves so that metrics might more easily be typed when part of known group that has more data. Such metrics might not normally be typed on their own due to lack of data.

Step 304 is for determining and applying properties from the metric type reference data to metrics of the corresponding type. Such cross-metric consolidation techniques are applied by type and group. Advanced consolidation techniques include heuristics (for example, "if 80% of the metrics are definitely pegs, then it is safe to assume the other ones also are pegs"), and rules, ordered by priority (for example, "no" takes precedence over "yes").

Step 305 is for locating an anomaly in the metric data using the properties found in step 301 to 304 and for providing an indication to a user that an anomaly has occurred. Possible indications can be the raising of one or several alarms. The solution aims to reduce the number of alarms by not raising an alarm for anomalous metric that are determined good properties, or could be used to generate different kinds of alarms depending on level of anomaly (for example by altering the type or severity of the alarm). Other responses could be to change the status of an object, for example a visual element. Step 306 is the end of the cross metric method.

Examples of the metric property types are described in more detail with respect to the example of FIG. 4. Metric type and property reference data 400 is a table data structure comprising rows and columns. Two important columns are the reference metric type column and the reference metric property column. A further example column is included for clarity.

In this example the reference metric type column includes: a percent metric type 402; an availability metric type 404; a response time metric type 406; a counter metric type 408 and general metric type 410. Percent metric type 402 is identified by a value that is between 0 and 100 and therefore the identifier property (IP) is: 0-100. By default a good property (GP) is the mode value (statistical term for most common value) and a bad property (BP) is a large change (50%) of the mode value. CPU usage and memory usage are examples of percent metric types.

Availability is a special type of percent metric type with particular bad and good properties.

Sometimes information about some metrics of a given type can be discovered but not always. This could be due to a lack of data availability, or small variance in the data for a given metric. For example, say a specific metric ("Service Availability" on a specific resource) has a mode of 100 for 95% of its values over a whole month, and this value happens to be its maximum value (all other values are lower than 100). Given that this value is so prevalent, the illustrative embodiment assumes that it is a good metric value and that lower values are bad metric values. Consider that 20% of all metrics of this "Service Availability" type have the same pattern, and that other metrics, while moving a lot more and therefore not having a mode, comply with a "maximum is 100" rule. The illustrative embodiment deduces that the properties first learnt on the first set of metrics should also be applied to other metrics of the same type. Therefore, the illustrative embodiment deduces that other "Service Availability" metrics also have a "good" value of 100, and that the lower the value gets, the worse it gets. This means that if some characteristics can be verified on some metrics of a given type, as these characteristics are known to be shared across all metrics of a given type, then they can be applied to all other metrics of the same type, without even knowing what the "type" is (the illustrative embodiment solution does not understand what "Service Availability" is—it just knows that all metrics of this type "have the same type").

Availability metric type 404 represents the availability of any device or service. Availability is also a percent metric type but having particular good properties and bad properties. For example: all availability metrics will go from 0% to 100%, 100% being a good metric value and lower values getting gradually worse; if 100% is a good metric value for one such metric, it will be good property for all other metrics of the same type.

Resource metric type 406 includes devices and services. Examples of network devices are physical and virtual machines, applications, CPUs, network cards, disks, routers. Examples of services are application services, system services and remote services. Usually, a single metric type will be present on several resources. For example, response time metric types is a type pf resource metric type 406 and will usually be present on many service resources, and "CPU usage" will be present on many physical and virtual machines. Response time metric types can be the response time of any device or service. Response time metrics have a minimum of 0, and lower values are better.

Counter metric type 408 is for metrics that either go up or go down. For example, "Number of packets since startup" has been detected as an ever-increasing number (also known as "peg"), all other instances of the same metric will share this property. For example, the value at t+delta is the value at time t, plus a delta (the value never decreases unless it is reset to zero). Identifying counters or pegs is important as the absolute value is meaningless; a delta with a timestamp is the value that needs to be monitored.

General metric type 410 is a default metric type for constant values if no other types can be identified. If a metric is an enumeration of a set of values (for example, it is always 0, or 1) with zero meaning good metric property and one meaning bad metric property based on frequency of the numbers.

Metrics are analyzed by looking at the performance counters over a predetermined time period, such as a month, without any human intervention and without any knowledge by the solution as to what the metrics mean. This thereby reduces the development and customer deployment costs, and enhances the intelligence of self-learning algorithms.

A metric is deemed as pegged if it only ever has a predetermined number of decreasing values in a row, e.g., one or two decreasing values in a row, but never three or more decreasing values one after the other. It could happen that there are two decreasing values in a row if the data dumps at a higher rate than the normalization rate, and therefore the middle data is an average of several values, including the highest value. But there are exceptions. If there are too many rollovers, then the metric is not treated as pegged. If the metrics have not changed at all then it is not treated as pegged. If there is too much missing data or too many identical values, then a metric is not treated as pegged. If a metric has negative values, then it is not treated as pegged.

An optional heuristic method for consolidating a group of metrics identified as potential counters is as follows. If one of the metrics is determined not to be a counter then all the metrics in the group are assumed not to be pegged. However, if there is no negative determination, and if a majority of metrics are identified as pegged, then all metrics in the group are assumed to be pegged. Otherwise, all metrics are assumed not to be pegged.

Further illustrative embodiments of the invention are now described. It will be clear to one of ordinary skill in the art that all or part of the logical process steps of the illustrative embodiment may be alternatively embodied in a logic apparatus, or a plurality of logic apparatus, comprising logic elements arranged to perform the logical process steps of the method and that such logic elements may comprise hardware components, firmware components or a combination thereof. It will be equally clear to one of skill in the art that all or part of the logic components of the illustrative embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative illustrative embodiment, the present invention may be realized in the form of a computer implemented method of deploying a service comprising steps of deploying computer program code operable to, when deployed into a computer infrastructure and executed thereon, cause the computer system to perform all operations of the method.

It will be appreciated that the method and components of the illustrative embodiment may alternatively be embodied fully or partially in a parallel computing system comprising two or more processors for executing parallel software.

Figure 5:
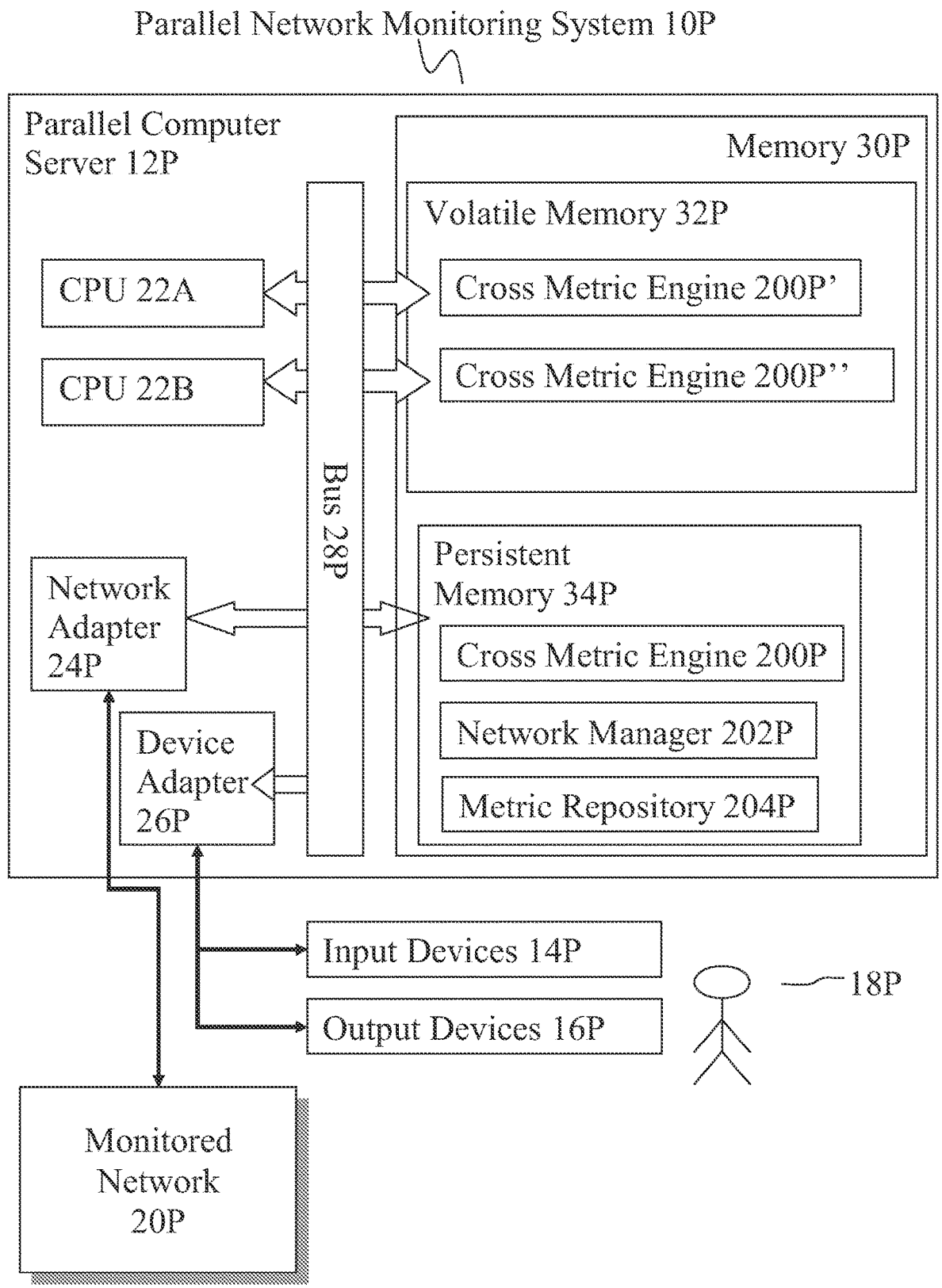
FIG. 5 is a deployment diagram of a parallel computing illustrative embodiment.

Referring to FIG. 5, an example parallel network monitoring illustrative embodiment is described comprising parallel network monitoring system 10P for parallel monitoring of a monitored network. This may be performed simultaneously by using multiple threads, processors or machines. As noted above, step 301 of the cross metric method can be performed on all metrics simultaneously as the problem is parallel. Furthermore, steps 302 and 303 can be performed on all metric types simultaneously. In the parallel illustrative embodiment, parallel instances of the cross metric engine 200 are instantiated (as object modules 200P' and 200P") and executed on respective parallel processors.

Parallel network monitoring system 10P may be described in the general context of parallel computer system executable instructions, such as parallel program modules, being executed by parallel network monitoring system 10P. Generally, parallel program modules may include routines, programs, objects, components, logic, data structures, that perform particular tasks or implement particular abstract data types. Parallel network monitoring system 10P comprises: parallel computer server 12P; input devices 14P; and output devices 16P. Parallel network monitoring system 10P communicates with user 18P via input devices 14P and output devices 16P. User 18P provides input and receives output from the parallel network monitoring system 10P but is not part of parallel network monitoring system 10P. Monitored network 20P provides access to network attached devices and is not part of the parallel network monitored system 10P.

Parallel computer server 12P comprises: CPU 22A, CPU 22B; network adapter 24P; device adapter 26P; bus 28P and memory 30P. Device adapter 26P provides the gateway between the parallel computer server 12P, input devices 14P and output devices 16P. Bus 28P represents one or more of any of several types of bus structures, including a memory bus or memory controller, a peripheral bus, an accelerated graphics port, and a processor or local bus using any of a variety of bus architectures. Memory 30P includes computer system readable media in the form of volatile memory 32P (such as random access memory and cache memory (not shown)) and in the form of non-volatile or persistent memory 34P.

In the depicted parallel computing embodiment, program modules comprise cross metric engine 200P, network manager 202P and metric repository 204P stored in persistent memory 34P, as well as an operating system, one or more application programs, a database management system and other program modules. Each of the operating system, one or more application programs, other program modules, and program data or some combination thereof, may include an implementation of a networking environment. Modules 200P' and 200P" are provided to carry out the functions and/or methodologies of the illustrative embodiments in a parallel environment as described herein.

Modules 200P' and 200P" are autonomous parts of the illustrative embodiments. In operation, module 200P is extracted from persistent memory 34P and instantiated into volatile memory 32P as modules 200P' and 200P" so that they may be executed separately and therefore in parallel by respective CPU 22A and CPU 22B.

In this example, two CPUs are shown but three or more CPUs can be used to build alternative parallel embodiments. In this example, two separate CPUs are used but a single processing unit having multiple cores could be used to build an alternative embodiment. In this example, the CPUs are physical CPUs. In the described parallel computing embodiment the parallel computer server 12P comprises multiple processing units. In an alternative parallel computing embodiment, a parallel computer server comprises a single processor having multiple cores. In a first virtual parallel computing embodiment, a computer server comprises a virtual computing environment and virtual parallel processing units could be used to build a virtual parallel computing embodiment. A computer server comprises a virtual computing environment having a virtual processing unit with multiple virtual cores. Further embodiments can comprises combinations of: real processing units; real processing unit cores; virtual processing units; and virtual parallel processing cores.

It will be clear to one skilled in the art that many improvements and modifications can be made to the foregoing exemplary embodiment without departing from the scope of the present invention.

What is claimed is:

1. A network managing system comprising:
a processor; and
a memory coupled to the processor, wherein the memory comprises instructions that are executed by the processor to cause the processor to:
generate a metric type reference data structure comprising a plurality of entries of metric type reference data, wherein one entry of the plurality of entries in the metric type reference data structure comprises:
a metric type identifier identifying a first predetermined metric type,
a corresponding standard metric property upon which a first plurality of metrics of first predetermined metric type are measured,
a good metric property identifying a potential behavior of each of the first plurality of metrics of the first predetermined metric type, as measured based on the standard metric property, that would be stable and expected, and
a bad metric property identifying a potential behavior of each of the first plurality of metrics of the first predetermined metric type, as measured based on the standard metric property, that would be unusual, and wherein a different entry of the plurality of entries in the metric type reference data structure comprises:
a different metric type identifier identifying a second predetermined metric type different from the first predetermined metric type,
a corresponding second standard metric property upon which a second plurality of metrics of the second predetermined metric type are measured,
a second good metric property identifying a potential behavior of each of the second plurality of metrics of the second predetermined metric type, as measured based on the second standard metric property, that would be stable and expected, and
a second bad metric property identifying a potential behavior of each of the second plurality of metrics of the second predetermined metric type, as measured based on the second standard metric property, that would be unusual; collect metric data from a plurality of managed network devices;
determine, for a collected metric in the collected metric data, that the collected metric is one of the first predetermined metric type or the second predetermined metric type, based on a matching of the collected metric to one of the first predefined metric type or the second predefined metric type in the metric type reference data structure;
automatically apply, based on a measurement of the collected metric in accordance with the standard metric property, a property corresponding to one of the first good metric property, the first bad metric property, the second good metric property, or the second bad metric property based results of determining that the collected metric is one of the first predetermined metric type or the second predetermined metric type; and
responsive to the applied property being one of the first bad metric property or the second bad metric property, automatically generate a notification of an anomaly.

2. The network managing system of claim 1, wherein the instructions further cause the processor to determine metric groups from the collected metric data, wherein a metric group is a group of metrics, in the collected metric data, from at least one of a same network resource, having a same property, or obtained from a same column of a database.

3. The network managing system of claim 2, wherein the instructions further cause the processor to configure, in response to a majority of metrics in a metric group being determined to be a particular metric type, all metrics in the metric group to that particular metric type.

4. The network managing system of claim 1, wherein the instructions cause the processor to collect metric data at least by one of streaming real time data or a bulk processing, and wherein the metric data is collected over at least one of a fixed time period or a rolling time period.

5. The network managing system of claim 1, wherein the first good metric property is a first mode value of a metric of the first predetermined metric type, and the first bad metric property is a predetermined amount of difference, from the first mode value, of a second mode value of the metric of the first predetermined metric type, wherein the first mode value is a most common value for the first predetermined metric type, and wherein the second mode value is a most common value of the metric of the first predetermined metric type.

6. The network managing system of claim 1, wherein at least one of the first good metric property or the first bad metric property is a measure of a likelihood that a metric of the first predetermined metric type is a peg, wherein a peg is a metric whose values only have a predetermined number of decreasing values in a row.

7. The network managing system of claim 1, wherein the first predetermined metric type comprises at least one of a percent metric type, an availability metric type, a response time metric type, or a counter metric type.

8. A method, in a data processing system comprising at least one processor and at least one memory coupled to the at least one processor, the at least one memory comprising instructions that are executed by the at least one processor to configure the at least one processor to implement a cross metric engine, wherein the method comprises:
generating, by the cross metric engine executing in the at least one processor, a metric type reference data structure comprising a plurality of entries of metric type reference data, wherein one entry of the plurality of entries in the metric type reference data structure comprises:
a metric type identifier identifying a first predetermined metric type,
a corresponding standard metric property upon which a first plurality of metrics of first predetermined metric type are measured,
a good metric property identifying a potential behavior of each of the first plurality of metrics of the first predetermined metric type, as measured based on the standard metric property, that would be stable and expected, and
a bad metric property identifying a potential behavior of each of the first plurality of metrics of the first predetermined metric type, as measured based on the standard metric property, that would be unusual, and wherein a different entry of the plurality of entries in the metric type reference data structure comprises:
a different metric type identifier identifying a second predetermined metric type different from the first predetermined metric type,
a corresponding second standard metric property upon which a second plurality of metrics of the second predetermined metric type are measured,
a second good metric property identifying a potential behavior of each of the second plurality of metrics of the second predetermined metric type, as measured based on the second standard metric property, that would be stable and expected, and
a second bad metric property identifying a potential behavior of each of the second plurality of metrics of the second predetermined metric type, as measured based on the second standard metric property, that would be unusual; collecting, by cross metric engine, in a metric repository, metric data from a plurality of managed network devices;
determine, by the cross metric engine, for a collected metric in the collected metric data, that the collected metric is one of the first predetermined metric type or the second predetermined metric type, based on a matching of the collected metric to one of the first predefined metric type or the second predefined metric type in the metric type reference data structure;
automatically applying, by the cross metric engine, based on a measurement of the collected metric in accordance with the standard metric property, a property corresponding to one of the first good metric property, the first bad metric property, the second good metric property, or the second bad metric property based results of determining that the collected metric is one of the first predetermined metric type or the second predetermined metric type; and
responsive to the applied property being one of the first bad metric property or the second bad metric property, automatically generating, by the cross metric engine, a notification of an anomaly.

9. The method of claim 8, further comprising determining, by the cross metric engine, metric groups from the collected metric data, wherein a metric group is a group of metrics, in the collected metric data, from at least one of a same network resource, having a same property, or obtained from a same column of a database.

10. The method of claim 9, further comprising configuring, by the cross metric engine, in response to a majority of metrics in a metric group being determined to be a particular metric type, all metrics in the metric group to that particular metric type.

11. The method of claim 8, wherein collecting metric data comprises at least by one of streaming real time data or a bulk processing, and wherein the metric data is collected over at least one of a fixed time period or a rolling time period.

12. The method of claim 8, wherein the first good metric property is a first mode value of a metric of the first predetermined metric type, and the first bad metric property is a predetermined amount of difference, from the first mode value, of a second mode value of the metric of the first predetermined metric type, wherein the first mode value is a most common value for the first predetermined metric type, and wherein the second mode value is a most common value of the metric of the first predetermined metric type.

13. The method of claim 8, wherein at least one of the first good metric property or the first bad metric property is a measure of a likelihood that a metric of the first predetermined metric type is a peg, wherein a peg is a metric whose values only have a predetermined number of decreasing values in a row.

14. The method of claim 8, wherein the first predetermined metric type comprises at least one of a percent metric type, an availability metric type, a response time metric type, or a counter metric type.

15. A computer program product for monitoring network devices, the computer program product comprising a non-transitory computer-readable storage medium having computer-readable program code embodied therewith, the computer-readable program code, when executed on a computing device, causes the computing device to:
generate a metric type reference data structure comprising a plurality of entries of metric type reference data, wherein one entry of the plurality of entries in the metric type reference data structure comprises:
a metric type identifier identifying a first predetermined metric type,
a corresponding standard metric property upon which a first plurality of metrics of first predetermined metric type are measured,
a good metric property identifying a potential behavior of each of the first plurality of metrics of the first predetermined metric type, as measured based on the standard metric property, that would be stable and expected, and
a bad metric property identifying a potential behavior of each of the first plurality of metrics of the first predetermined metric type, as measured based on the standard metric property, that would be unusual, and wherein a different entry of the plurality of entries in the metric type reference data structure comprises:
a different metric type identifier identifying a second predetermined metric type different from the first predetermined metric type,
a corresponding second standard metric property upon which a second plurality of metrics of the second predetermined metric type are measured,
a second good metric property identifying a potential behavior of each of the second plurality of metrics of the second predetermined metric type, as measured based on the second standard metric property, that would be stable and expected, and
a second bad metric property identifying a potential behavior of each of the second plurality of metrics of the second predetermined metric type, as measured based on the second standard metric property, that would be unusual; collect metric data from a plurality of managed network devices;
determine, for a collected metric in the collected metric data, that the collected metric is one of the first predetermined metric type or the second predetermined metric type, based on a matching of the collected metric to one of the first predefined metric type or the second predefined metric type in the metric type reference data structure;
automatically apply, based on a measurement of the collected metric in accordance with the standard metric property, a property corresponding to one of the first good metric property, the first bad metric property, the second good metric property, or the second bad metric property based results of determining that the collected metric is one of the first predetermined metric type or the second predetermined metric type; and responsive to the applied property being one of the first bad metric property or the second bad metric property, automatically generate a notification of an anomaly.

16. The computer program product of claim 15, wherein the computer readable program further causes the computing device to determine metric groups from the collected metric data, wherein a metric group is a group of metrics, in the collected metric data, from at least one of a same network resource, having a same property, or obtained from a same column of a database.

17. The computer program product of claim 16, wherein the computer readable program further causes the computing device to configure, in response to a majority of metrics in a metric group being determined to be a particular metric type, all metrics in the metric group to that particular metric type.

18. The computer program product of claim 15, wherein the computer readable program further causes the computing device to collect metric data at least by one of streaming real time data or a bulk processing, and wherein the metric data is collected over at least one of a fixed time period or a rolling time period.

19. The computer program product of claim 15, wherein the first good metric property is a first mode value of a metric of the first predetermined metric type, and the first bad metric property is a predetermined amount of difference, from the first mode value, of a second mode value of the metric of the first predetermined metric type, wherein the first mode value is a most common value for the first predetermined metric type, and wherein the second mode value is a most common value of the metric of the first predetermined metric type.

20. The computer program product of claim 15, wherein at least one of the first good metric property or the first bad metric property is a measure of a likelihood that a metric of the first predetermined metric type is a peg, wherein a peg is a metric whose values only have a predetermined number of decreasing values in a row.

\* \* \* \* \*